US012428357B2

(12) United States Patent
Straathof et al.

(10) Patent No.: US 12,428,357 B2
(45) Date of Patent: Sep. 30, 2025

(54) PRINTING OF ENERGETIC MATERIALS

(71) Applicant: Nederlandse Organisatie voor toegepast-natuurwetenschappelijk onderzoek TNO, 's-Gravenhage (NL)

(72) Inventors: Michiel Hannes Straathof, Delft (NL); Kjeld Jacobus Cornelis Van Bommel, Geldrop (NL); Christoffel Adrianus Van Driel, Delft (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 703 days.

(21) Appl. No.: 17/436,762

(22) PCT Filed: Mar. 6, 2020

(86) PCT No.: PCT/NL2020/050149
§ 371 (c)(1),
(2) Date: Sep. 7, 2021

(87) PCT Pub. No.: WO2020/185070
PCT Pub. Date: Sep. 17, 2020

(65) Prior Publication Data
US 2022/0177387 A1 Jun. 9, 2022

(30) Foreign Application Priority Data
Mar. 8, 2019 (EP) ..................... 19161621

(51) Int. Cl.
C06B 21/00 (2006.01)
B29C 64/118 (2017.01)
(Continued)

(52) U.S. Cl.
CPC ........ *C06B 21/0075* (2013.01); *B29C 64/118* (2017.08); *B29C 64/209* (2017.08);
(Continued)

(58) Field of Classification Search
CPC ... C06B 21/0075; C06B 45/12; B29C 64/118; B29C 64/209; B29C 64/336;
(Continued)

(56) References Cited

U.S. PATENT DOCUMENTS 7,063,810 B1  6/2006 Murphy et al.
2003/0206820 A1* 11/2003 Keicher .................. B22F 10/25
                                                     419/9
(Continued)

FOREIGN PATENT DOCUMENTS

EP  3222408 A1  9/2017
EP  3222961 A1 * 9/2017 ............. B33Y 70/00
(Continued)

OTHER PUBLICATIONS

Ik-Jun Choi, et al., "Novel Three-Dimensional Extrusion of Multilayered Ceramic/Camphene Mixture for Gradient Porous Ceramics", J. Am. Ceram. Soc., vol. 99, No. 2, pp. 395-398, 2016.
(Continued)

Primary Examiner — Michael M. Robinson
(74) Attorney, Agent, or Firm — LUCAS & MERCANTI, LLP

(57) ABSTRACT

The invention is directed to a method for the preparation of an energetic material product such as a propellant or explosive charge or grain. The method includes additive manufacturing with co-extrusion of at least two materials to form a multi-layered filament and layer-by-layer deposition of the multi-layered filament. The multi-layered filament has a first material layer and a second material layer and at least one layer includes an energetic material. In another aspect, the
(Continued)

invention is directed to an apparatus for use in this method, the apparatus comprising a co-extrusion nozzle.

9 Claims, 4 Drawing Sheets

(51) Int. Cl.
| | | |
|---|---|---|
| B29C 64/209 | (2017.01) | |
| B29C 64/336 | (2017.01) | |
| B29L 31/20 | (2006.01) | |
| B33Y 10/00 | (2015.01) | |
| B33Y 30/00 | (2015.01) | |
| B33Y 40/00 | (2020.01) | |
| B33Y 70/10 | (2020.01) | |
| B33Y 80/00 | (2015.01) | |
| C06B 45/12 | (2006.01) | |

(52) U.S. Cl.
CPC ............ *B29C 64/336* (2017.08); *B33Y 10/00* (2014.12); *B33Y 30/00* (2014.12); *B33Y 40/00* (2014.12); *B33Y 70/10* (2020.01); *B33Y 80/00* (2014.12); *C06B 45/12* (2013.01); *B29L 2031/20* (2013.01)

(58) Field of Classification Search
CPC ......... B33Y 10/00; B33Y 30/00; B33Y 40/00; B33Y 70/10; B33Y 80/00
See application file for complete search history.

(56) References Cited

U.S. PATENT DOCUMENTS

| | | | |
|---|---|---|---|
| 2009/0208647 A1 | 8/2009 | Ryf et al. | |
| 2017/0268133 A1* | 9/2017 | Graley | ............... D01F 1/10 |
| 2018/0022023 A1 | 1/2018 | Therriault et al. | |
| 2018/0370119 A1* | 12/2018 | Spence | ............... C06B 23/001 |
| 2019/0184641 A1* | 6/2019 | Swier | ............... B29C 64/314 |
| 2019/0375150 A1* | 12/2019 | Achten | ............... B29C 64/118 |

FOREIGN PATENT DOCUMENTS

| | | |
|---|---|---|
| EP | 3444234 A1 | 2/2019 |
| GB | 2384207 A | 7/2003 |
| WO | 2015021545 A1 | 2/2015 |
| WO | 2017164731 A1 | 9/2017 |
| WO | 2017164732 A1 | 9/2017 |

OTHER PUBLICATIONS

Serena Duchi, et al., "Handheld Co-Axial Bioprinting: Application To in Situ Surgical Cartilage Repair", Scientific Reports, vol. 7, No. 5837, 2017.

Fang Peng, et al., "Enhanced Impact Resistance of 3D Printed Arts With Structured Filaments", ACS Applied Materials & Interfaces, pp. 1-29, 2018.

International Search Report and Written Opinion for Corresponding International Application No. PCT/NL2020/050149 4 (10 Pages) (Jul. 9, 2020).

* cited by examiner

PRINTING OF ENERGETIC MATERIALS

CROSS-REFERENCE TO RELATED APPLICATIONS

This application is a 371 of PCT/NL2020/050149, filed Mar. 6, 2020, which claims the benefit of European Patent Application No. 19161621.8, filed Mar. 8, 2019.

FIELD OF THE INVENTION

The invention is directed to energetic material products, the preparation thereof and apparatus for such preparation. In particular, the invention is directed to additive manufacturing of energetic material products.

BACKGROUND OF THE INVENTION

Energetic materials are used in various applications such as rocket propulsion, pyrotechnics, ballistics and explosives. The products of the materials can generally be classified into three types of product: pyrotechnics, propellants and explosives. The nature of the materials is roughly the same, but the decomposition reaction may differ depending on the intended use. In case of pyrotechnics and propellants, the energetic material typically deflagrates, while in explosives, the energetic material typically detonates. Further depending on the intended use, products may have different compositions and geometries, e.g. rod-shaped or sheet-shaped grains, powders and charges.

Energetic material products are typically solids and conventionally prepared by processes including drying of water-wet pastes, mixing and kneading with ether and alcohol and other constituents, pressing the material dough through a die, cutting the obtained strand into the product shape, and drying this product. With the conventional preparation methods (such as extrusion), only charges of limited geometries heretofore could be economically manufactured. Consequently, the number of variables that could be manipulated to achieve a given specified performance was limited.

To enable manipulation of further variables in order to create a more optimized energetic material product, additive manufacturing processes of propellant charges have been suggested (see e.g. WO 2017/164732 and references cited herein). Suitable radiation curable energetic compositions for additive manufacturing are disclosed in WO 2017/164731 and EP 3 222 408. A limitation of the known additive manufacturing processes is that, although two or more different energetic materials can be used per product, the materials can only differ from deposited layer-to-layer because pre-mixing two or more energetic materials may be complicated or not possible at all, due to factors like high viscosity (which complicates effective mixing). Thus, the current additive manufacturing processes for energetic materials are still limiting the final design of the product that can be achieved. For instance, to produce an energetic product having a variation of the burn rate in a cross-sectional direction, one is limited to the number of layers and in particularly to the amount of different types of energetic materials that can consecutively be deposited.

SUMMARY OF THE INVENTION

An object of the present invention is to at least partially address the above-mentioned drawbacks and to improve the additive manufacturing process of energetic products resulting in more flexibility and less limitations of the product design.

The present inventors have surprisingly found that the object can be achieved by co-extruding at least two different material feeds to deposit a multi-layered filament. This enables, if so desired, continuous variation of the overall composition of the deposited filament.

Accordingly, the present invention is directed to a method for the preparation of an energetic material product, wherein said method comprises additive manufacturing comprising co-extrusion of at least two materials (1,2) to form a multi-layered filament and layer-by-layer deposition of said multi-layered filament, wherein said multi-layered filament (3) comprises a first material layer (31) and a second material layer (32) of which at least one comprises an energetic material.

The co-extrusion can be carried out by using a co-extrusion nozzle, which is part of an apparatus for additive manufacturing of an energetic material product. Such an apparatus is also an aspect of the present invention.

Co-axial structures through co-extrusion in additive manufacturing from entirely different types of materials and nozzles therefore are disclosed in US 2018/0022023 and US 2017/0268133.

Co-extrusion of entire propellant grains is known in the art (see e.g. WO2015/021545). Such co-extrusion processes however, should not be confused with the co-extrusion in additive manufacturing according to the present invention. In the present invention, a filament is co-extruded that is subsequently laid down or deposited in successive layers to form the energetic product, as is typical in additive manufacturing (in the art is also referred as "3D printing", "additive layer manufacturing" or ALM). In additive manufacturing, each deposited layer is generally very thin (for example between 20-5000 μm) and many layers are formed in a sequence with the two-dimensional shape varying on each layer to provide the desired final three-dimensional profile. This is in contrast to conventional extrusion processes wherein the product as such is extruded. It also differs from conventional "subtractive" manufacturing processes wherein material is removed to form a desired component profile and from casting for example. For the invention described herein, the layers in the multi-layered filament are to be distinguished from the deposited layers in that the layers in the multi-layered filament are formed by co-extrusion, while the deposited layers are formed by the deposition of the filament.

DETAILED DESCRIPTION OF THE INVENTION

Figure 1:
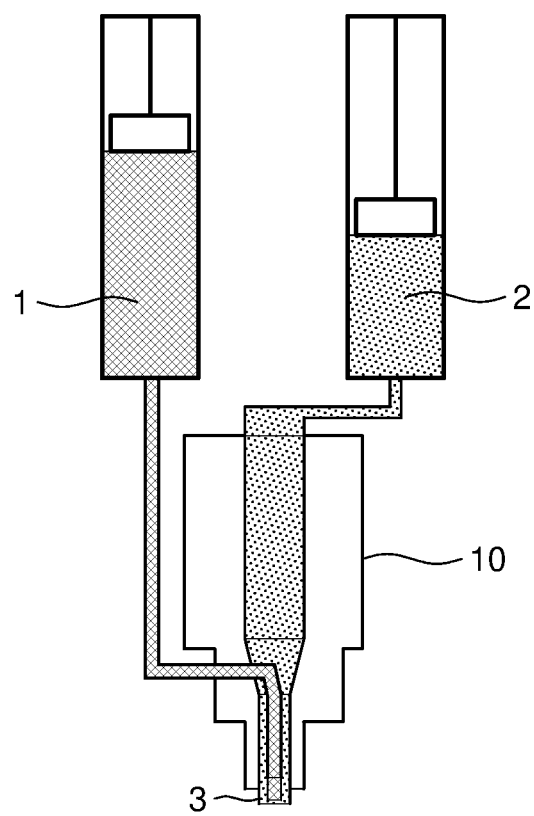
In FIG. 1, an embodiment of a co-extrusion nozzle (10) in accordance with the present invention is illustrated. This nozzle comprises a concentrically arranged co-extrusion die.
Figure 2:
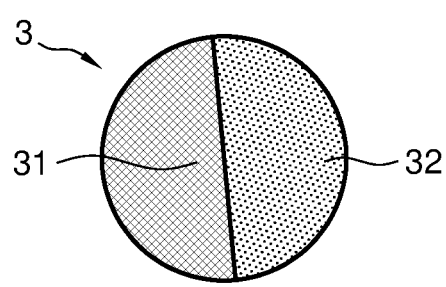
FIG. 2 illustrates a cross-section of an embodiment of the present invention including a multi-layered filament (3) having two parallel co-extruded layers (31,32).
Figure 3:
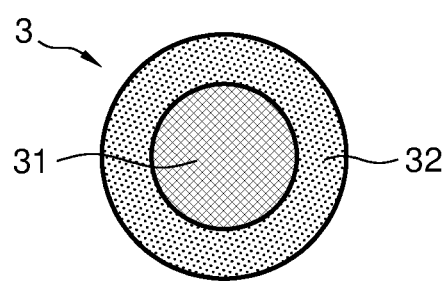
FIG. 3 illustrates a multi-layered filament (3), which can be produced by the co-extrusion nozzle (10) as illustrated in FIG. 1.

The multi-layered filament comprises at least two layers of different materials. At least one of these materials is an energetic material. Energetic materials are substances or mixtures of substances that, through chemical reaction, are capable of rapidly releasing energy. In the context of this invention, an energetic material typically comprises fuel and oxidizer. The fuel and oxidizing function may also be present in a single component or molecule, as is for instance typically the case in explosive materials. Typically, energetic materials are solid, liquid or gaseous substances or mixtures which are capable of very fast chemical reactions without the use of additional reactive species (e.g. oxygen from surrounding air). The reaction can be initiated by means of for instance mechanical, thermal or shock wave stimuli. Energetic components can be applied in explosives, rocket and gun propellants, pyrotechnics, gas generators etc. The energetic components of the present invention are distinguished from solid propellants used in hybrid rockets, which are only capable of a chemical reaction once they are brought into contact with the additional liquid (or gas) propellant that is initially kept separate from the solid propellant. The energetic materials can be mixed with binders (energetic binder or other types of binders, e.g. UV-curable binders—vide infra) and shaped into products such as grains, powders and charges. The shaped products of energetic materials, optionally mixed with other materials, are herein referred to as energetic material products, or simply energetic products.

Advantageously, the present invention enables variation of the amount of at least one energetic material in the multi-layered filament during the additive manufacturing process. This enables tailoring of the material properties throughout the energetic product. The amount of at least one energetic material can be varied during the manufacturing process by varying the volume ratio of the first material layer to the second material during at least part of the additive manufacturing process.

The inventors surprisingly found that in order to vary the volume ratio of the extruded materials, it is not required to change any mechanical part of the additive manufacturing apparatus. Thus, in order to change the volume ratio, it is not required to substitute the die of the extrusion nozzle to change the cross-sectional shape of the multi-layered filament. Instead, it was surprisingly found to be sufficient to change the ratio of extrusion rates of the individual materials. For instance, if the extrusion rate (in volume per time unit) of the first material (1) is increased while the extrusion rate of the second material (2) is reduced and the sum of extrusion rates is kept constant, the amount of the first material in the filament increases while the diameter of the filament and thus the thickness of the deposited layer remains essentially constant. Accordingly, in a preferred embodiment of the invention, the method comprises independently controlling the extrusion rates of each material feed such that the volume ratio of the first material layer to the second material layer can be controlled and preferably such that the sum of all extrusion rates can be maintained essentially constant.

Although not required, it is preferred that the multi-layered filament comprises a core-shell structure. As such, preferably, the first material layer is a core layer comprising said first material and said second material layer is a shell layer comprising said second material surrounding said core layer. The core-shell structure was found to be particularly favorable for varying the volume ratio of the first and second material by controlling the individual extrusion rates, as described herein above. Another particular advantage of the core-shell structure is that this provides particular flexibility with respect to the composition of the core layer. In other structures than the core-shell structure, both the first and second material layers must have the correct properties (e.g. viscosity) for additive manufacturing. Yet another advantage of the core-shell structure is that it enables the outer surface of each filament to be of the same substance (i.e. the shell layer substance) which is beneficial for effective and predictable binding and/or adhesion between deposited filaments. In the core-shell structure according to this preferred embodiment, the core layer may have a lower viscosity than the shell layer (and even lower than possible for non-core-shell structures), because the shell layer can provide the filament with the mechanical properties that are required for additive manufacturing. In another embodiment, the shell layer may have a lower viscosity than the core layer. A lower viscosity generally results in better flow which may for instance be advantageous for limiting pores or voids in the product.

Figure 4:
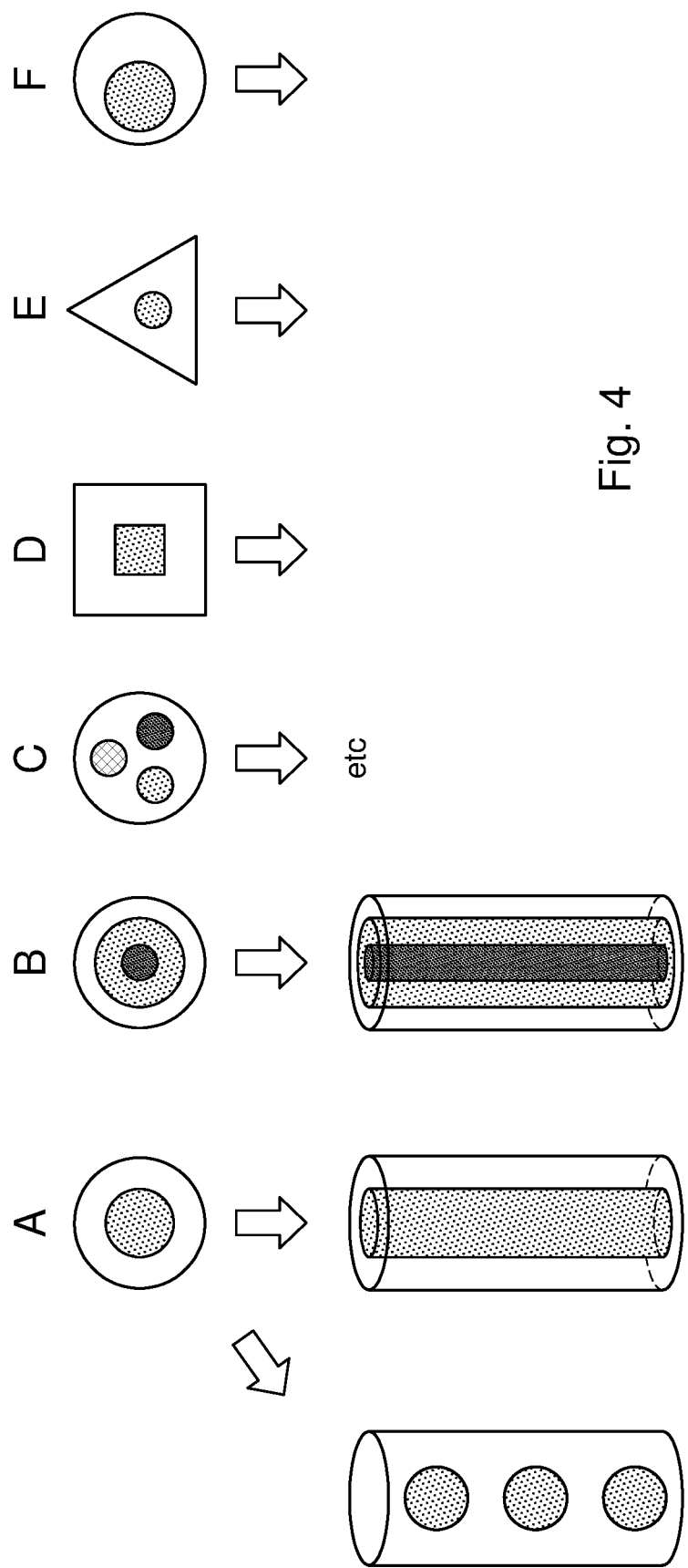
FIG. 4 illustrates yet other multi-layered filaments which can be produced according to the present invention.

Various core-shell structures can be envisioned, of which some are illustrated in FIG. 4. The core layer can be concentrically arranged with the shell layer (FIGS. 4-A, B, D and E) or non-concentrically (FIGS. 4-C and F). A concentric arrangement of the core and shell layers is preferred, i.a. for better control over the process. Each layer can have different cross-sectional shapes, as exemplified in FIGS. 4-D and F. In particular embodiments, the multi-layered filament comprises more than two material layers, e.g. three layers (exemplified in FIG. 4-B) or four layers (exemplified in FIG. 4-C). Using more than two layers is preferred for even higher flexibility in design of the energetic product, but may also pose design challenges for the co-extrusion nozzle.

In a particular embodiment, a plurality of core layers based on the same material may be separately positioned in parallel to the longitudinal axis of the filament (as for instance illustrated in FIG. 4C). Separately positioned means herein that each of said layers is individually surrounded by the shell layer. By distributing, in particularly by homogeneously distributing the core layers, a blended filament is approximated without any true mixing of the core and the shell materials with for instance a static mixer. The more core layers are distributed within the shell layer, the better the approximation of a blended filament is.

The dimensions of the multi-layered filament are typically such that the inscribed circle of its cross section has a diameter in the range of 250 µm or higher, for instance up to 1500 µm, preferably in the range of 500 to 1000 µm. However, greater diameter than 1500 µm can also be implemented. For instance, rocket engines or other large energetic material products may have dimensions in the order of several meters, in which case said diameter of the filament may be in the order of centimeters such as 20 cm or less. The dimensions are typically limited for practical reasons such as the nozzle design.

Upon deposition of the filament in the additive manufacturing process, the filament is generally compressed and flattened by a smaller distance of the tip of the nozzle to the previously deposited layer than the thickness of the filament. As such, a solid product body can be obtained, without voids being present between the deposited layers. In certain embodiments however, it may be that the energetic material product contains pores or voids between deposited layers. The dimensions of the multi-layered filament as described herein are to be considered as the dimensions of the filament without such compression or flattening. Typically, these dimensions are about the same as the dimensions of the die through which the filament is extruded.

In a preferred embodiment of the present invention, both the first material layer and the second material layer each comprise energetic materials. In a particularly preferred embodiment, each material has a different burn rate or detonation velocity such that, by varying the volume ratios of the materials, the burn rate or detonation velocity throughout at least part of the energetic product can be varied. The term "burn rate" refers to the rate at which an energetic materials releases gas during combustion, which is commonly measured as the mass of material consumed per unit time, e.g., g/s. The term "detonation velocity" refers to the velocity at which a shock wave front travels through the detonated energetic material, which is commonly measured as distance travelled per unit time, e.g. m/s.

For instance, the ratio of the energetic materials in the deposited multi-layered filaments may be chosen in such a way that the energetic material product may comprise an inner part having a higher burn rate than its outer part. As such, the linear burn rate (i.e. the rate with which the burning surface normal to the surface regresses) of the product may increase from the surface to inwards the product. The surface is any surface that is in direct contact with the environment. The surface includes the surface of any perforations in the energetic product. Hence, when burning commences, from any exterior surface (including inside perforations) the linear burn rate increases as propellant is consumed.

It may also be advantageous to have a distribution of the energetic materials with different burn rates and/or linear burn rates in the product which, from the surface of the energetic product inwards, initially provides a relatively higher burn rate and/or linear burn rate, subsequently a relatively lower burn rate and/or linear burn rate, and thereafter a relatively higher burn rate and/or linear burn rate.

It may be appreciated that, alternatively or in addition to the variations in burn rate or detonation velocity, other material properties can be varied as well. For instance, the viscosity, curability and/or stability can also differ from the first material to the second material. The deposited layers may also differ in terms of mechanical properties such as strength, toughness, tenacity and the like. Also parameters such as detonation properties such as shock initiation sensitivity or critical diameter or pyrotechnic properties such as flame color, smoke color and/or frequency of produced sound can be varied. In the embodiment wherein the multi-layered filament has the core-shell structure as described herein above, the shell layer preferably has a higher viscosity than the core layer.

The present invention enables the provision of a functional gradient in any of the above-mentioned material properties throughout at least part of the energetic product, without the requirement of blending various materials. A gradient can be discrete, continuous or essentially continuous. A discrete gradient can be formed by discrete, adjacently deposited layers of materials (as for example described in WO 2017/164732). For optimal performance however, a continuous or essentially continuous gradient is preferred as this will provide a smoother transition in material properties.

With the present invention, a continuous gradient can be obtained by continuously varying the volume ratio of the first material to the second material. In practice, such a continuous variation can be achieved in the longitudinal direction of the multi-layered filament. In the axial direction or directions between the axial and longitudinal directions, the gradient is in practice typically an essentially continuous gradient.

An essentially continuous gradient is a gradient which progresses in small discrete steps, but which steps are considerably smaller than can be achieved by extrusion of a non-layered filament, as e.g. described in aforementioned WO 2017/164732. For instance, with the conventional method described in WO 2017/164732, the change of 100 weight % first material to 100 weight % second material can only be achieved in one single, large step: depositing first a layer (or row) of the first material and adjacently depositing a second layer (or row) of the second material. Even if 100 layers would be deposited, the step would still be made from one layer to the next layer, thus a discrete step of 100% difference. In contrast, the present invention enables to vary the amount of first material within the deposited filament and within each deposited layer (or row) very slightly, e.g. 1 weight %, such that the gradient of 100 weight % first material to 100 weight % second material is achieved in 100 layers, having 100 very small discrete steps resulting in an essentially continuous gradient. An example of an essentially continuous gradient porous ceramics materials (i.e. a non-energetic material) was found to be described in Choi et al. *J. Am. Ceram. Soc.* 99 (2016) 395-398.

By using the multi-layered filament comprising the plurality of core layers that are separately positioned in the shell layer as described herein-above (see for instance FIG. 4C), it is possible that the essentially continuous gradient even further approximates a continuous gradient.

The present invention is typically not confined to specific materials and energetic materials, as long as these materials allow to be used in additive manufacturing.

The amount of energetic material in the energetic product may be 30% or more by total weight of the product, such as 40-95%, or 45-90%. It is possible that ingredients in the product perform multiple functions. For example, an energetic material can at the same time be a plasticizer or a binder.

In addition to the energetic materials, energetic products may further comprise a binder, which binder may or may not be an energetic binder. Suitable non-energetic binders include acrylates as disclosed in WO2017/164731, hydroxy terminated polybutadiene (HTPB), carboxyl terminated polybutadiene (CTPB), hydroxyl terminated polyether (HTPE), polypropylene glycol (PPG), polyphenyl ether (PPE), and hydroxy-terminated caprolactone ether (HTCE). Suitable energetic binders include nitrocellulose, polyvinylnitrate, polynitropolyphenyle, glycidyl azide polymer (GAP), poly(3-azidomethyl 3-methyl oxetane) (polyAMMO), poly(2-nitratomethyloxirane) (polyGLYN), poly(3-nitratomethyl-3-methyloxetane) (polyNIMMO), copolymer of glycidyl azide polymer and poly(bis(azidomethyl)oxetane (GAP-co-poly(BAMO)). Preferably, the energetic product comprises one or more binders selected from hydroxy terminated polybutadiene, hydroxyl terminated polyether hydroxy-terminated caprolactone ether, nitrocellulose, polyvinylnitrate, and glycidyl azide polymer.

The total amount of binder in the energetic product can be in the range of 5-70% by total weight of the energetic product, such as 10-50%, or 15-40%.

Further ingredients that may be present in the energetic product include plasticizers (energetic or non-energetic), antioxidants, bonding agents, burn rate modifiers, stabilizers. The total amount of these optional further ingredients may be up to 40% by total weight of the energetic product, such as up to 30%. Plasticizers may be present in an amount of 0-60% by total weight of the energetic product, such as 10-50%, of 15-35%. Antioxidants may be present in an amount of 0-7% by total weight of the energetic product, such as 0-5%. Bonding agents may be present in an amount of 0-7% by total weight of the energetic product, such as 0-5%. Burn rate modifiers may be present in an amount of 0-7% by total weight of the energetic product, such as 0-5%. Stabilizers may be present in an amount of 0-4% by total weight of the energetic product, such as 0-2%.

Suitably, at least one of the energetic materials can be dispersed as a solid material in a binder, such as in the form of small crystals. In an embodiment, all of the energetic materials are dispersed as a solid material in the other components of the product.

The additive manufacturing method of the present invention preferably comprises layer-by-layer curing of the deposited multi-layered filament such that a solid polymer is formed that adheres to the previously cured deposited layer. Accordingly, the first and/or second material preferably comprises a curable binder. In a preferred embodiment, the curable binder is cured by radiation (such as ultraviolet or visible radiation) or thermally. More preferably, the curable binder is cured by ultraviolet radiation. For its lower temperature, curing by ultraviolet radiation has the advantage of being safer than thermal curing given the presence of energetic material.

Surprisingly, the inventors found that layer-by-layer curing typically results in a very strong adhesion between deposited layers and increases the mechanical strength of the energetic product.

Without wishing to be bound by theory, the inventors believe that this strong adhesion is achieved by a curing reaction taking place between two adjacent deposited layers, even if these layers are subsequently cured. Typically, ultraviolet radiation causes radicals to form within and/or on the surface of the binder that induce curing via free radical polymerization. It is however believed that, as the deposited layer typically remains in contact with the atmosphere, or at least with molecular oxygen, several of the radicals may be quenched before all curable groups (e.g. olefinic groups) can react. As such, curable groups remain that can still be reacted in a next curing step, e.g. with curable groups of a subsequent, adjacent layer. After the deposition of the adjacent, subsequent layer, the remaining curable groups are typically not all exposed to the atmosphere or molecular oxygen anymore and therefore the reaction of the remaining curable groups with the curable groups of a subsequent, adjacent layer may further be promoted.

Moreover, it is believed that the ultraviolet radiation may penetrate a deposited layer such that curing of a subsequent layer may result in ultraviolet radiation penetrating to the previously deposited layer or layers. Radicals within and/or on the surface of the binder of the subsequent layer may thereby be formed, which can then induce free radical polymerization resulting in curing of the interphase of adjacent layers. Furthermore, radicals that are formed within and/or on the surface of the binder of the freshly deposited layer, can induce free radical polymerization that extends into the previously deposited layer or layers. This process is believed to result in an unusually strong binding of adjacently deposited layers. For this reason, it is preferred that adjacently deposited layers comprise a binder or binders that are capable of reacting with each other upon curing (e.g. acrylates). More preferably, the adjacently deposited layers comprise the same binder and/or binders that are capable of reacting with each other upon curing.

In the embodiment wherein the filament has the core-shell structure as described herein-above, it may be sufficient to cure only the shell layer, since this layer can surround and fixate the core layer. Accordingly, preferably the second material comprises the curable binder.

The energetic product obtainable by the method according to the present invention is another aspect of the present invention. The product can be shaped like conventional energetic products such as grains and charges, but may have any other shape that can be obtained by additive manufacturing.

The energetic product in accordance with the present invention comprises both the first and second materials that have been deposited as layers of the multi-layered filament. As such, typically, the first and second material can be found in a pattern through at least part of the cross-section of the energetic material. The pattern i.a. depends on the way the materials have been co-extruded from the die and on the way the product has been built up by the multi-layered filament.

In a preferred embodiment, the energetic product comprises a functional continuous or essentially continuous gradient of a material property throughout at least part of the energetic product. In a particularly preferred embodiment, the energetic material comprises a continuous or essentially continuous gradient in burn rate.

The gradient that can be obtained by the present invention is not to be confused with impregnating an energetic product with a plasticizer (see for instance US 2009/0208647), because such conventional products are produced by extrusion or casting and not by additive manufacturing. Impregnation does not result in the patterns that can be obtained by additive manufacturing in accordance with the present invention. Moreover, impregnation is limited in the depth that can be reached by the impregnation medium and is therefore typically only suitable for small-caliber gun propellant grains. In contrast, additive manufacturing is particularly suitable for medium and large caliber grains and larger charges. The energetic products in accordance with the present invention have a typical minimum dimension (e.g. radius, length, width or the like) of 5 mm.

Figure 5:
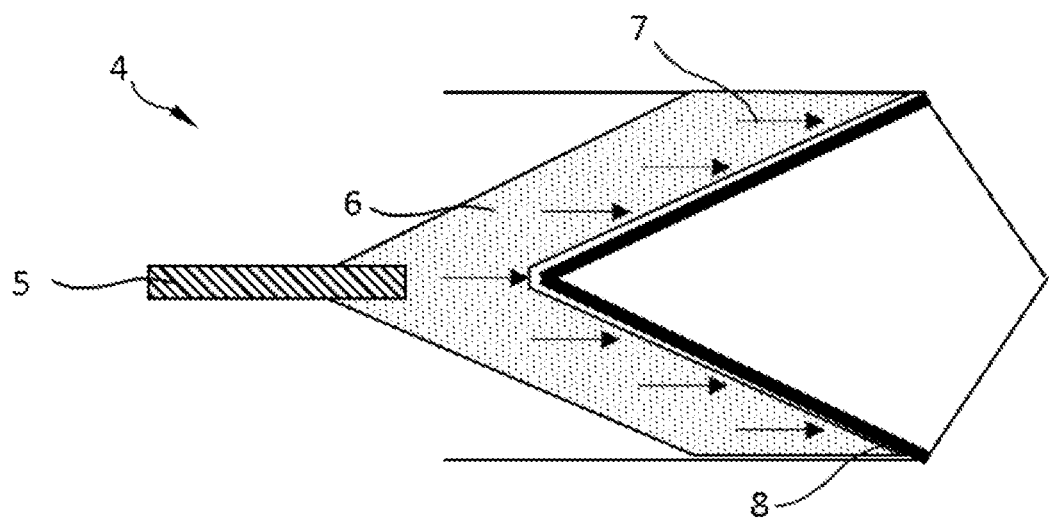
FIGS. 5 and 6 illustrate an embodiment according to the present invention which is a hollow charge.
Figure 6:
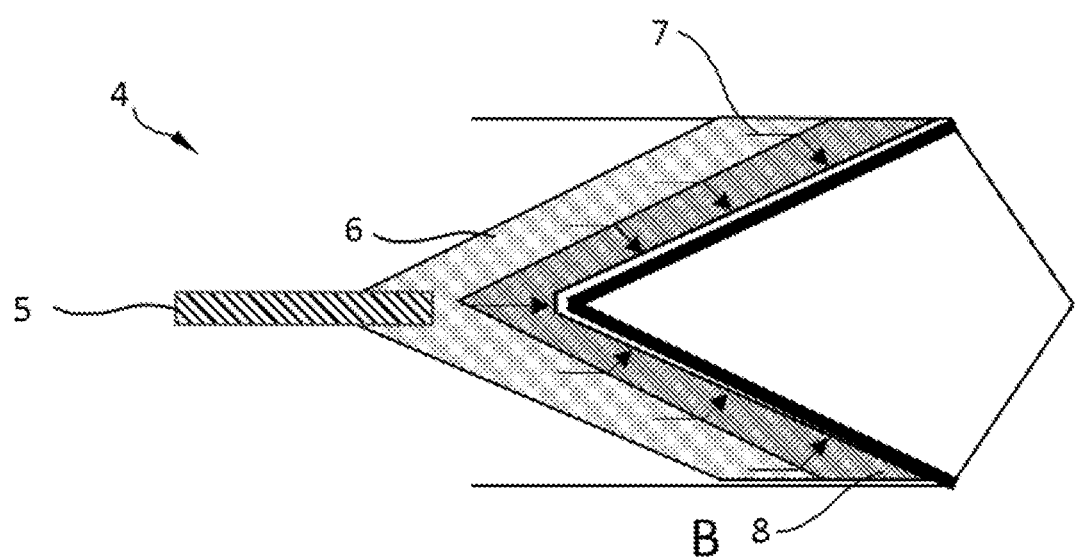

The gradient that can be obtained by the present invention is furthermore not necessarily maximally progressing in a direction perpendicular from the product's surface, which is the case for impregnated grains because the impregnation medium penetrates the grain from its surface in a direction perpendicular to this surface. Advantageously, the gradient in the energetic product according to the present invention can have a varying direction and slope. As such, for instance, the present invention is particularly suitable for the preparation of a hollow charge (6) for use in e.g. rocket propelled grenade (4), of which a gradient in the detonation velocity can be used to diffract the propagating shockwave (7) after detonation trigger by the detonator (5) to transfer its energy more effectively (e.g. more perpendicularly) to the liner (8) (cf. FIGS. 5 and 6).

Another aspect of the present invention is directed to an apparatus for use in the method of additive manufacturing of the energetic product. Said apparatus comprises a co-extrusion nozzle connected to a first material feed and to a second material feed by separate extrusion channels. As such, the co-extrusion nozzle differs from conventional, regular nozzles used in additive manufacturing. Although such conventional nozzles may also be used to obtain a ceramic material gradient (see for instance Choi et al. *J. Am. Ceram. Soc.* 99 (2016) 395-398 that described extrusion making use of the wall slip phenomenon to induce a gradient in flow velocity), the control over the individual extrusion rates is limited or absent.

Preferably, the co-extrusion nozzle comprises a co-extrusion die, more preferably a die having an outer opening of which an inscribed circle has a diameter in the range of 250 µm or higher, for instance up to 1500 µm, preferably in the range of 500 to 1000 µm. Even higher diameters of for instance 20 cm or less may also be possible. These dimensions correspond to the preferred dimension of the filament (vide supra).

The apparatus according to the present invention preferably further comprises means to individually control the extrusion rates of the first and second material feeds. Examples of such means include separately controllable pumps or ram-extruders for the material feeds.

The apparatus according to the present invention must be able to suitably and safely process energetic materials. Safety measures that can be employed are for instance the use of friction-reducing components, grounding of metallic components that can come in contact with the energetic material, and the like to prevent unintended burning or exploding of the energetic material. Accordingly, the co-extrusion nozzle is preferably grounded or adapted for grounding.

As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features.

For the purpose of clarity and a concise description features are described herein as part of the same or separate embodiments, however, it will be appreciated that the scope of the invention may include embodiments having combinations of all or some of the features described.

Example 1

Figure 7:
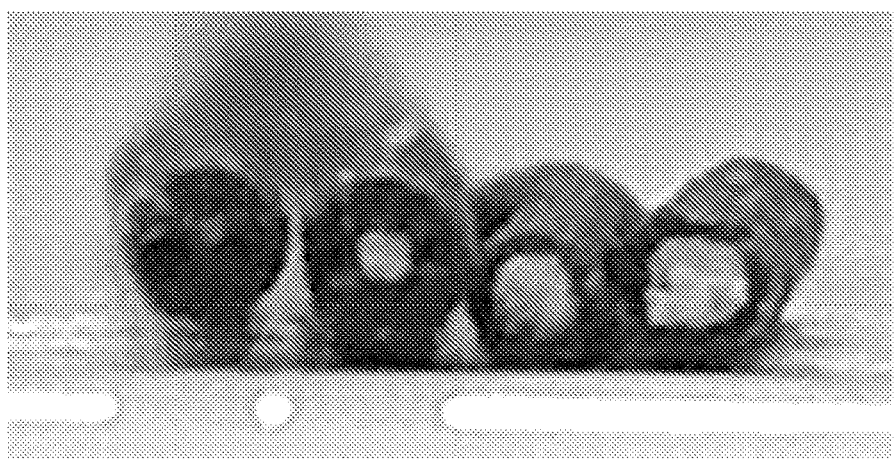
FIG. 7 shows a photograph of a cross-sectional view of four segments of a co-extruded multi-layered filament having various core/shell ratios obtained by variation of the extrusion ratios in accordance with the invention.

A multi-layered filament was produced by co-extrusions of two similar, clay-like materials with different colors. During production of the filament, the ratio of extrusion speeds was continuously varied, keeping the total amount of extruded material constant. FIG. 7 shows the cross-section of the multi-layered filament at different locations and how the ratio between the material layers changed accordingly.

Example 2

Figure 8:
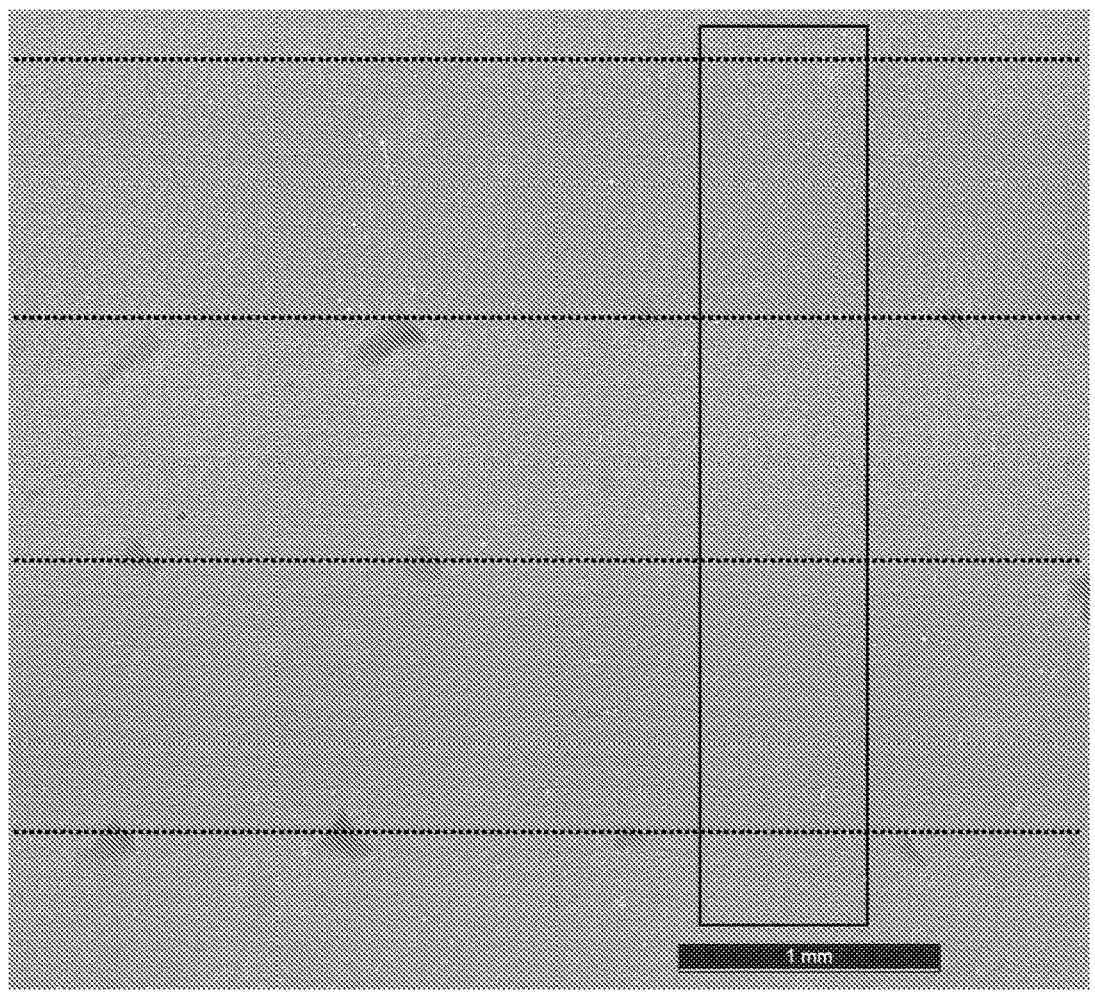
FIG. 8 shows a close-up photograph of a cross-section of an energetic material product. Five deposited layers can be distinguished (the frontier is indicated with the layover dotted line), which layers are alternating off-white and pink.

Several material layers were deposited, where the material was alternated between two similar materials with different colors to be able to more easily distinguish between the layers. FIG. 8 show that in a direction perpendicular to the direction of deposition, the material layers have completely fused together, with the color changes being the only indication of material transitions.

The invention claimed is:

1. A method for the preparation of an energetic material product wherein said method comprises additive manufacturing comprising co-extrusion of at least two material feeds to form a multi-layered filament and layer-by-layer deposition of said multi-layered filament,
    wherein said multi-layered filament comprises a first material layer comprising a first energetic material and a second material layer comprising a second energetic material,
    wherein said first energetic material has a different burn rate or detonation velocity than the second energetic material, and
    wherein during said co-extrusion for forming the multi-layered filament, the volume ratio of the first material layer to the second material layer is varied by independently controlling the extrusion rates of each material feed, such that a continuous gradient is obtained in a longitudinal direction of the multi-layered filament, wherein the continuous gradient may be from 100 wt. % of first material to 100 wt. % of second material.

2. The method according to claim 1, wherein the volume ratio of the first material layer to the second material layer is varied such that a gradient of at least one material property is obtained throughout at least part of the energetic material product.

3. The method according to claim 1, wherein said first material layer is at least one core layer comprising said first material and said second material layer is at least one shell layer comprising said second material surrounding said core layer.

4. The method according to claim 1, wherein the second material has a higher viscosity than the first material.

5. The method according to claim 3, wherein said shell layer comprises a UV-curable binder.

6. The method according to claim 1, wherein said multi-layered filament has an inscribed circle of the cross section having a diameter in the range of 250 µm or more.

7. The method of claim 6, wherein the multi-layered filament has an inscribed circle of the cross section having a diameter in the range of up to 1500 µm.

8. The method of claim 1, wherein the energetic material product is selected from the group consisting of pyrotechnics, propellants, explosive charges, and grains.

9. The method of claim 1, wherein the volume ratio of the first material layer to the second material layer is controlled by maintaining the sum of all extrusion rates essentially constant.

* * * * *